(12) United States Patent
Ogino et al.

(10) Patent No.: US 11,686,386 B2
(45) Date of Patent: Jun. 27, 2023

(54) SHIFT DEVICE

(71) Applicant: AISIN CORPORATION, Kariya (JP)

(72) Inventors: Atsuto Ogino, Kariya (JP); Kota Ishikawa, Kariya (JP); Yutaka Uchida, Kariya (JP)

(73) Assignee: AISIN CORPORATION, Kariya (JP)

( * ) Notice: Subject to any disclaimer, the term of this patent is extended or adjusted under 35 U.S.C. 154(b) by 590 days.

(21) Appl. No.: 16/817,958

(22) Filed: Mar. 13, 2020

(65) Prior Publication Data

US 2021/0071757 A1 Mar. 11, 2021

(30) Foreign Application Priority Data

Sep. 5, 2019 (JP) ................. 2019-161869

(51) Int. Cl.
*F16H 61/02* (2006.01)
*F16H 59/08* (2006.01)
*F16H 61/32* (2006.01)

(52) U.S. Cl.
CPC ............. *F16H 61/32* (2013.01); *F16H 59/08* (2013.01); *F16H 61/0204* (2013.01); *F16H 2061/326* (2013.01)

(58) Field of Classification Search
CPC ...... F16H 59/08; F16H 61/0204; F16H 61/32; F16H 2061/0225
See application file for complete search history.

(56) References Cited

U.S. PATENT DOCUMENTS

| 7,370,547 | B2 | 5/2008 | Amamiya et al. | |
| 7,549,351 | B2 | 6/2009 | Amamiya et al. | |
| 7,549,352 | B2 | 6/2009 | Amamiya et al. | |
| 7,845,248 | B2 * | 12/2010 | Yoshiyama | F16H 63/3458 192/219.6 |
| 8,789,643 | B2 * | 7/2014 | Iwami | F16H 61/32 192/220.2 |
| 9,951,866 | B2 | 4/2018 | Kuwahara et al. | |
| 2005/0174084 | A1 * | 8/2005 | Nakai | F16H 61/32 318/632 |
| 2006/0103339 | A1 * | 5/2006 | Yamada | G05B 5/01 318/623 |
| 2007/0046243 | A1 * | 3/2007 | Hori | F16H 61/32 318/630 |
| 2017/0335960 | A1 * | 11/2017 | Nagata | F16H 59/54 |

FOREIGN PATENT DOCUMENTS

| JP | 2004-308752 A | 11/2004 |
| JP | 2016-075364 A | 5/2016 |

\* cited by examiner

*Primary Examiner* — Bobby Rushing, Jr.
(74) *Attorney, Agent, or Firm* — Sughrue Mion, PLLC

(57) ABSTRACT

A shift device includes: a shift switching member including valley parts corresponding to a shift position; a positioning member provided to establish the shift position in a state of being fitted into any one of the valley parts; a motor including a rotor and a stator and driving the shift switching member; a speed reduction mechanism section rotating the shift switching member in a state in which a rotation speed transmitted from the motor is reduced; a rotor rotational angle sensor detecting a rotational angle of the rotor; and an output shaft rotational angle sensor detecting a rotational angle of the shift switching member A width of a backlash included in the speed reduction mechanism section is detected, and the rotational angle of the motor corresponding to the center of the backlash is acquired.

8 Claims, 7 Drawing Sheets

STATE OF BEING ABLE TO TRANSMIT DRIVING FORCE

STATE OF BEING UNABLE TO TRANSMIT DRIVING FORCE
(STATE OF BEING ABLE TO SWING)

SHIFT DEVICE

CROSS REFERENCE TO RELATED APPLICATIONS

This application is based on and claims priority under 35 U.S.C. § 119 to Japanese Patent Application 2019-161869, filed on Sep. 5, 2019, the entire contents of which are incorporated herein by reference.

TECHNICAL FIELD

This disclosure relates to a shift device mounted on a vehicle.

BACKGROUND DISCUSSION

In the related art, a shift device mounted on a vehicle is known (for example, see JP 2016-75364A).

JP 2016-75364A discloses a shift device including an actuator unit that operates based on a control signal corresponding to a shift operation by an occupant, and a shift switching mechanism section that switches a shift position by being driven by the actuator unit. In the shift device described in JP 2016-75364A, the actuator unit includes a motor, a speed reduction mechanism section, a motor rotational angle sensor, an output shaft rotational angle sensor, and an engine control unit (ECU). Further, the actuator unit includes an output shaft provided on the output side of the speed reduction mechanism section. The motor rotational angle sensor detects a rotation amount (rotational angle) of the rotor. The output shaft rotational angle sensor detects an output angle (rotational angle) of the output shaft.

In JP 2016-75364A, the shift switching mechanism section includes a detent plate and a detent spring. The detent plate is a plate including a plurality of valley parts according to the shift position. The detent spring establishes the shift position in a state where the detent spring is fitted into any one of the plurality of valley parts of the detent plate. The detent plate is fixed to the lower end portion of the output shaft of the actuator unit. Then, the detent plate rotates integrally with the output shaft of the actuator unit.

In JP 2016-75364A, the motor is rotated based on a control signal from the ECU according to the operation of the operation section by the occupant, and the rotation of the motor is transmitted to the output shaft in a state of being reduced by the speed reduction mechanism section. Then, by rotating the detent plate together with the output shaft, the detent spring located at one valley part of the detent plate is moved to another valley part. Thereby, the shift position is switched.

Further, in the shift device described in JP 2016-75364A, in order to improve the positioning accuracy of the detent spring with respect to the detent plate, the position of the valley bottom of the valley part into which the detent spring is fitted is acquired in advance. Specifically, the speed reduction mechanism section includes a driving-side member (gear) provided on the actuator side and a driven-side member (gear) provided on the detent plate side and rotating together with the driving-side member. Also, a predetermined amount of backlash is provided between the driving-side member and the driven-side member. Accordingly, the rotation of the motor causes the driven-side member to rotate together with the driving-side member in a state where the backlash between the driving-side member and the driven-side member is reduced. Until the backlash is reduced, the driving-side member rotates with the rotation of the motor while the driven-side member does not move. Further, the detent spring has a biasing force. Since the backlash is provided between the driving-side member and the driven-side member, when the detent spring falls from the top portion to the valley part of the detent plate, the driven-side member rotates faster than the driving-side member rotates due to the biasing force of the detent spring. For this reason, in a state where the detent spring is located at the valley bottom of the valley part, the backlash is not reduced, and the detection value of the output shaft rotational angle sensor (rotational angle of driven-side member) does not substantially change while the detection value of the motor rotational angle sensor (rotational angle of driving-side member) changes.

Then, in the shift device described in JP 2016-75364A, the motor is rotated a plurality of times in the forward direction and the reverse direction in one valley part of the plurality of valley parts, so that a state in which the detection value of the output shaft rotational angle sensor does not change while the detection value (count value) of the motor rotational angle sensor changes is detected a plurality of times. That is, the range of the detection value (count value) of the motor rotational angle sensor in a state in which the detection value of the output shaft rotational angle sensor does not change is detected as the backlash width. Then, the detection value (count value) of the motor rotational angle sensor in the middle of this range (width of backlash) is acquired as the detection value (position) of the motor rotational angle sensor corresponding to the valley bottom of one valley part (center of backlash). After the rotational angle of the motor corresponding to the valley bottom of one valley part is acquired, the rotational angle of the motor corresponding to the valley bottom of another valley part of the plurality of valley parts is acquired by the same operation as the above-described operation.

In the shift device described in JP 2016-75364A, in order to acquire the rotational angle of the motor corresponding to the valley bottom of the valley part into which the detent spring is fitted, the width of the backlash is acquired by rotating the motor a plurality of times in the forward direction and the reverse direction for each valley part. Therefore, it takes a relatively long time to acquire the rotational angle of the motor corresponding to each of the valley bottoms of the plurality of valley parts. Therefore, it is desired to reduce the tact time for acquiring the rotational angle of the motor corresponding to each of the valley bottoms (center of backlash) of the plurality of valley parts of the detent plate (shift switching member).

Thus, a need exists for a shift device which is not susceptible to the drawback mentioned above.

SUMMARY

A shift device according to an aspect of this disclosure is configured to be mounted on a vehicle, and includes a shift switching member that includes a plurality of valley parts corresponding to a shift position, a positioning member that is provided to establish the shift position in a state of being fitted into any one of the plurality of valley parts of the shift switching member, a motor including a rotor and a stator and driving the shift switching member, a speed reduction mechanism section that rotates the shift switching member in a state in which a rotation speed transmitted from the motor is reduced, a rotor rotational angle sensor that detects a rotational angle of the rotor, and an output shaft rotational angle sensor that detects a rotational angle of the shift switching member, in which a width of a backlash included in the speed reduction mechanism section is detected based on an output value of the output shaft rotational angle sensor and an output value of the rotor rotational angle sensor while moving the positioning member so as to continuously pass through the plurality of the valley parts, and the rotational angle of the rotor corresponding to a center of the backlash is calculated based on the detected width of the backlash, and the rotational angle of the motor corresponding to the center of the backlash is acquired based on association between the calculated rotational angle of the rotor corresponding to the center of the backlash and the output value of the output shaft rotational angle sensor corresponding to a valley bottom of the valley part.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of disclosed here will be described based on the drawings.

First, the configuration of a shift device 100 according to the present embodiment will be described with reference to FIGS. 1 to 11. In the specification of the present application, "the rotational angle of the motor" and "the rotational angle of the rotor" have the same meaning.

Figure 1:
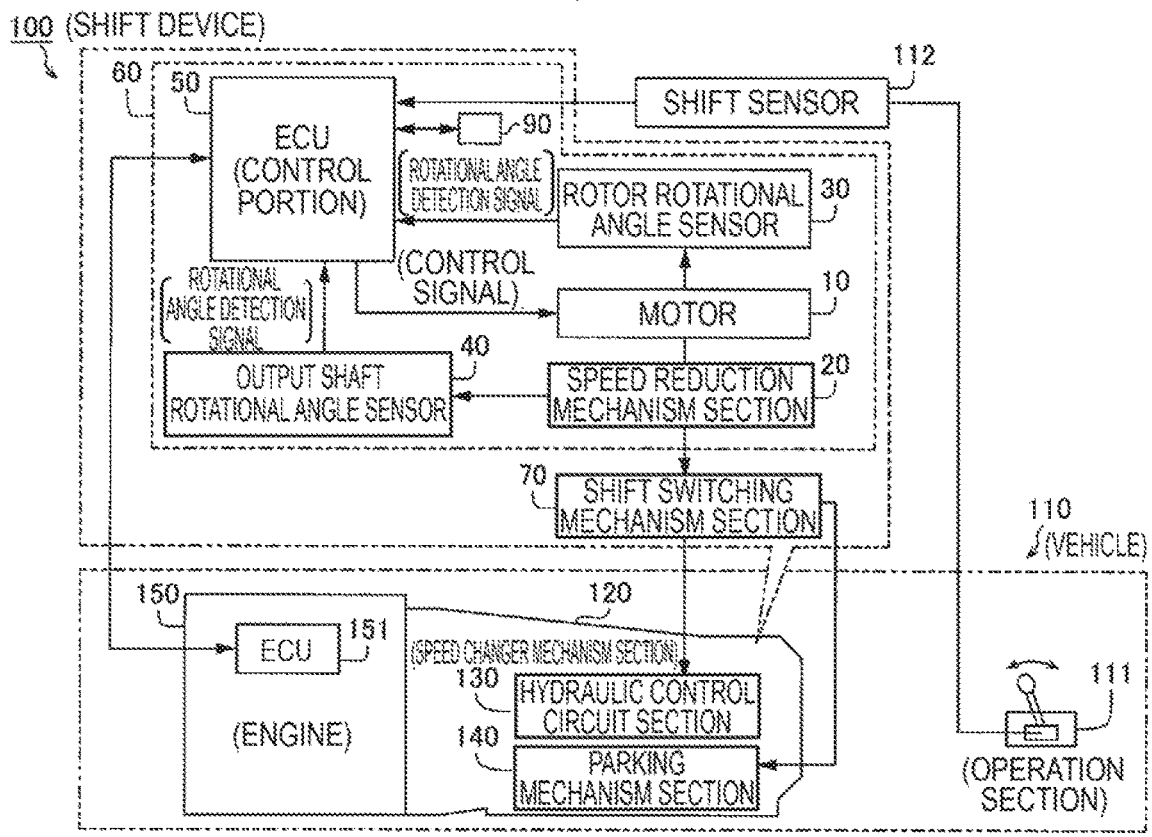
FIG. 1 is a block diagram showing a control configuration of a shift device according to an embodiment disclosed here.

The shift device 100 according to the present embodiment is mounted on a vehicle 110 such as an automobile. As shown in FIG. 1, in the vehicle 110, when the occupant (driver) performs a shift switching operation via an operation section 111 such as a shift lever (or a shift switch), electrical shift switching control for a speed changer mechanism section 120 is performed. That is, the position of the shift lever is input to the shift device 100 via a shift sensor 112 provided in the operation section 111. Then, based on a control signal transmitted from a dedicated ECU 50 provided in the shift device 100, the speed changer mechanism section 120 is switched to any shift position of a P (parking) position, an R (reverse) position, an N (neutral) position, and a D (drive) position corresponding to an occupant's shift operation. Such shift switching control is called shift-by-wire (SBW).

The shift device 100 includes an actuator unit 60 and a shift switching mechanism section 70 driven by the actuator unit 60. The shift switching mechanism section 70 is mechanically connected to a manual spool valve (not shown) of a hydraulic valve body in a hydraulic control circuit section 130 in the speed changer mechanism section 120 and to a parking mechanism section 140. The shift state (P position, R position, N position, and D position) of the speed changer mechanism section 120 is mechanically switched by driving the shift switching mechanism section 70.

Figure 2:
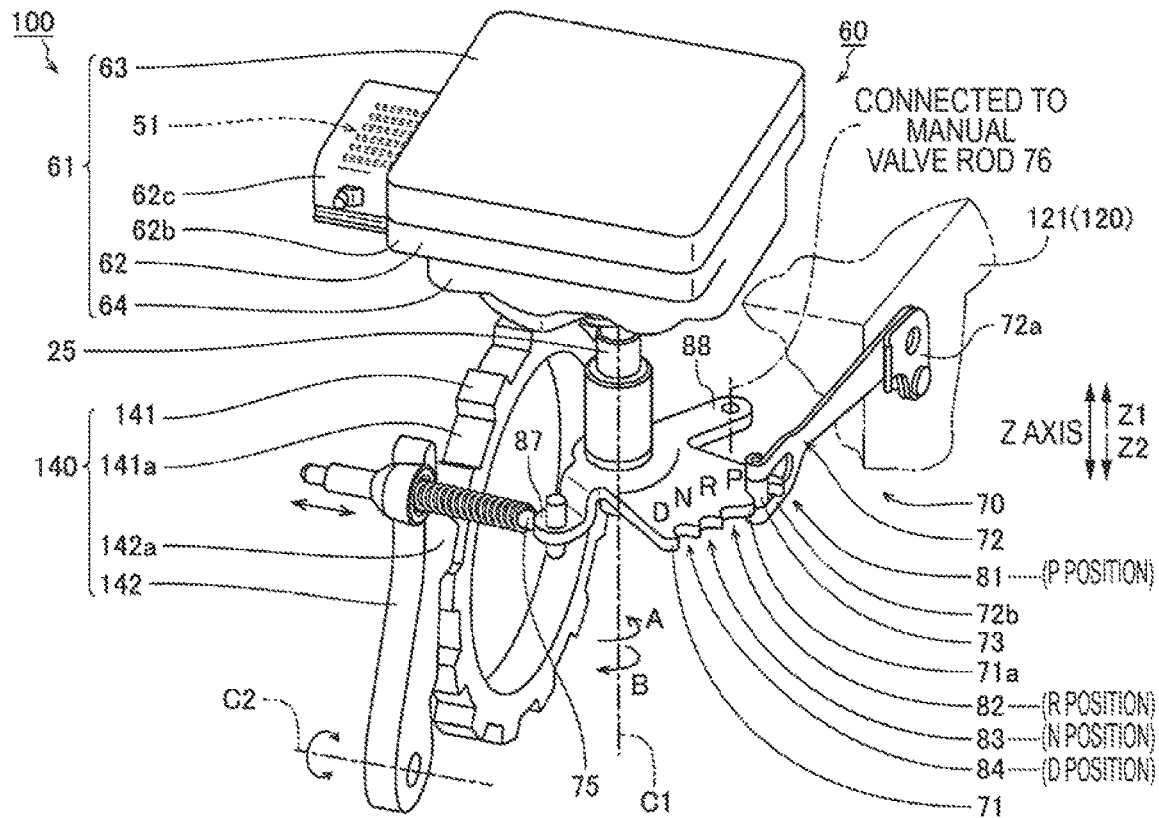
FIG. 2 is a perspective view schematically showing an entire configuration of the shift device according to the embodiment disclosed here.

The actuator unit 60 includes a motor 10, a speed reduction mechanism section 20, a rotor rotational angle sensor 30, an output shaft rotational angle sensor 40, and the ECU 50. As shown in FIG. 2, the ECU 50 is a substrate component in which an electronic component is mounted on a substrate 51. These components are housed in a box-shaped main body portion 61 fixed to the case of the speed changer mechanism section 120. Further, the actuator unit 60 includes an output shaft 25 connected to the output side of the speed reduction mechanism section 20.

As shown in FIG. 2, the shift switching mechanism section 70 includes a detent plate 71 (an example of a shift switching member in the claims) and a detent spring 72 (an example of a positioning member in the claims). The detent spring 72 is configured to hold the detent plate 71 at a rotational angle position corresponding to each of the P position, the R position, the N position, and the D position.

Figure 3:
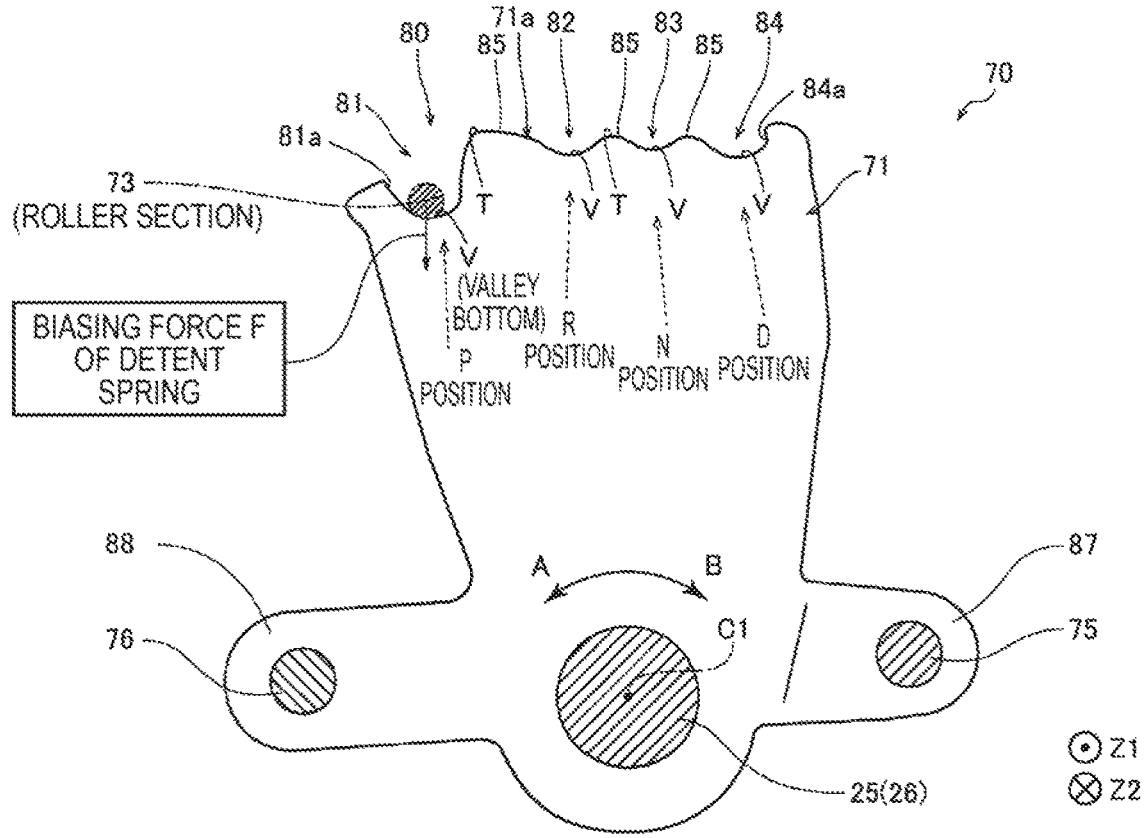
FIG. 3 is a diagram showing a structure of a detent plate included in the shift device according to the embodiment disclosed here.

As shown in FIG. 3, the detent plate 71 has four valley parts 80 (valley parts 81 to 84) provided corresponding to the shift positions (P position, R position, N position, and D position). Further, a cam face 71a having a continuous undulating shape is formed on the detent plate 71 by the valley parts 81 to 84. The valley parts 80 adjacent to each other (for example, the valley part 81 and the valley part 82, the valley part 82 and the valley part 83) are separated by a peak part 85 having one top portion T. The detent spring 72 has a base end portion 72a (see FIG. 2) fixed to a casing 121 (see FIG. 2) of the speed changer mechanism section 120 and a roller section 73 attached to the free end 72b (see FIG. 2). In the detent spring 72, the roller section 73 always presses the cam face 71a (the position of any one of the valley parts 81 to 84 or the peak part 85). Then, the detent spring 72 establishes the shift position in a state where the detent spring 72 is fitted into any one of the plurality of valley parts 81 to 84.

In the present embodiment, as shown in FIG. 3, among the plurality of valley parts 80 included in the detent plate 71, the valley part 81 (an example of an end portion side valley part of the claims) and the valley part 84 (an example of an end portion side valley part of the claims) disposed at the most end portion sides are provided with a wall portion 81a and a wall portion 84a for suppressing the detent spring 72 from moving beyond the valley part 81 and the valley part 84, respectively. Specifically, the wall portion 81a is provided in a valley part 81 disposed at an end portion of the detent plate 71 in the direction of arrow A. Further, the wall portion 84a is provided in the valley part 84 disposed at an end portion of the detent plate 71 in the direction of arrow B.

As shown in FIG. 2, the detent plate 71 is fixed to the lower end portion (Z2 side) of the output shaft 25, and the detent plate 71 is rotated around a rotation axis C1 integrally with the output shaft 25. As a result, the detent spring 72 is configured such that when the roller section 73 slides along the cam face 71a in accordance with the forward/reverse rotation (swing) of the detent plate 71 in the direction of arrow A or the direction of arrow B, the roller section 73 is fitted into any one of the valley parts 81 to 84 by the biasing force F of the detent spring 72. In addition, the detent spring 72 is configured to hold the detent plate 71 at the rotational angle position corresponding to the P position, the R position, the N position, or the D position by the roller section 73 being selectively fitted into any one of the valley parts 81 to 84 of the detent plate 71. Thereby, the P position, the R position, the N position or the D position are individually established.

The detent plate 71 further has an arm section 87 and an arm section 88. A park rod 75 is connected to the arm section 87, and a manual valve rod 76 (see FIG. 3) is connected to the arm section 88. When the detent plate 71 is rotated to the rotational angle position corresponding to the R position, the manual spool valve at the distal end portion of the manual valve rod 76 is moved to a position corresponding to the R position in the hydraulic valve body. Accordingly, a hydraulic circuit for the R position is formed in the hydraulic control circuit section 130 (see FIG. 1). For the other shift positions, similarly to the R position, the manual valve rod 76 (manual spool valve) is moved to a position corresponding to any one of the shift positions with the rotation of the detent plate 71, so that a hydraulic circuit corresponding to each shift position is formed within the hydraulic control circuit section 130.

As shown in FIG. 2, the parking mechanism section 140 includes a parking gear 141 connected to a crank shaft (not shown) of an engine 150, and a lock pawl 142 that engages with the parking gear 141. The lock pawl 142 is moved to a lock position and an unlock position as the park rod 75 moves. When the detent plate 71 is rotated to the rotational angle position corresponding to the P position, the lock pawl 142 is rotated around a rotation axis C2 to the lock position and a protruding portion 142a engages with a tooth bottom section 141a of the parking gear 141. As a result, free rotation of the parking gear 141 is restricted, and rotation of the crank shaft is restricted. When the detent plate 71 is rotated to a rotational angle position corresponding to a shift state (R, N, and D positions) other than the P position, the lock pawl 142 is rotated to the unlock position, and thereby the engagement between the lock pawl 142 and the parking gear 141 is released.

As shown in FIG. 1, the shift device 100 includes a nonvolatile storage section 90. The nonvolatile storage section 90 is provided inside the actuator unit 60.

Next, a detailed configuration of the actuator unit 60 will be described.

Figure 4:
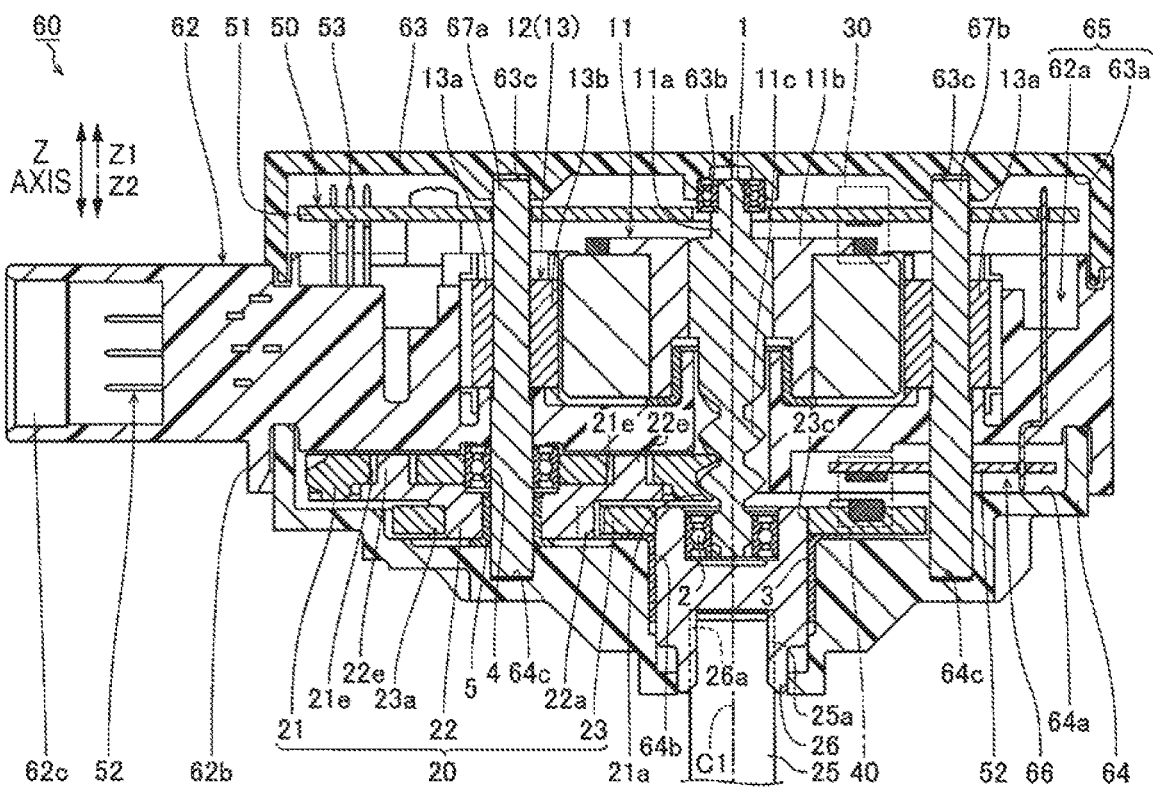
FIG. 4 is a sectional view showing an actuator unit constituting the shift device according to one embodiment disclosed here.

As shown in FIG. 4, the main body portion 61 of the actuator unit 60 includes a motor housing 62, a motor cover 63, and a gear housing 64. The motor housing 62 and the motor cover 63 made of resin having heat resistance are assembled in a state where a recess portion 62a and a recess portion 63a face each other, and thereby the motor 10 and the ECU 50 are housed in a motor chamber 65. Further, the gear housing 64 made of resin faces a recess portion 64a and is assembled from a side (Z2 side) opposite to the motor housing 62, and thereby the speed reduction mechanism section 20 is housed in a gear chamber 66.

A socket 62c having a terminal 52 is formed on one outer face 62b of the motor housing 62. The terminal 52 is electrically connected to the ECU 50 via a wiring 53. Then, electric power is supplied to the actuator unit 60 via a wiring cable (not shown) connected to the socket 62c. Further, mutual communication between the ECU 50 and an ECU 151 (see FIG. 1) that controls the engine 150 is performed via the wiring cable. The ECU 50 is electrically connected to the motor 10 (see FIG. 1), the rotor rotational angle sensor 30 (see FIG. 1), and the output shaft rotational angle sensor 40 (see FIG. 1).

As shown in FIG. 4, the motor 10 has a rotor 11 rotatably supported with respect to a motor housing 62 and a stator 12 disposed around the rotor 11 so as to face each other with a magnetic gap therebetween. The motor 10 is configured to drive the detent plate 71.

As the motor 10, a surface permanent magnet type (SPM) three-phase motor in which a permanent magnet is incorporated on the surface of the rotor 11 is used. Specifically, the rotor 11 has a shaft pinion 11a and a rotor core 11b, and N-pole magnets and S-pole magnets as permanent magnets are alternately attached to the surface of the rotor core 11b around the rotation axis C1 at equal angular intervals (45°). Therefore, the number of poles of the motor 10 is eight.

An upper end portion (Z1 side) of the shaft pinion 11a is rotatably supported by a bearing member 1 disposed in a rotary shaft support section 63b of the motor cover 63, and a lower end portion (Z2 side) is rotatably supported by a bearing member 2 of an output bearing section 26 rotatably supported by a bearing member 3 press-fitted into the output shaft support section 64b. The bearing member 2 is disposed along the inner periphery of the recess portion at the upper end portion (Z1 side) of the output bearing section 26. Thereby, the shaft pinion 11a of the rotor 11 and the output shaft 25 are rotated around the same rotation axis C1. In the shaft pinion 11a, a gear section 11c in which gear grooves are formed in a helical shape is integrally formed in an outer peripheral region from a center portion to the lower end portion (Z2 side). The gear section 11c is a so-called helical gear with a small number of teeth having a small number of teeth and a large twist angle so that the gear diameter is sufficiently small.

As shown in FIG. 4, the stator 12 has a stator core 13 fixed in the motor chamber 65 of the motor housing 62 and excitation coils (not shown) of a plurality of phases (U phase, V phase and W phase) that generate a magnetic force by conduction.

As shown in FIG. 4, the stator core 13 integrally has a substantially cylindrical main body portion 13a having the same axial center as the shaft pinion 11a of the rotor 11 and a plurality (four) of teeth 13b protruding from an inner wall face of the main body portion 13a toward the axial center side. Of these teeth 13b, through holes are respectively formed in a pair of teeth 13b disposed on both sides in a radial direction opposite to each other about the axial center in parallel to the shaft pinion 11a. A rod-shaped support shaft 67a and a support shaft 67b inserted into a through hole of the motor housing 62 pass through the through holes. In the support shaft 67a and the support shaft 67b, a rear end portion (upper end portion in FIG. 4) is fitted into a recess portion 63c of the motor cover 63 and a front end portion (lower end portion in FIG. 4) is fitted into the recess portion 64c of the gear housing 64. Thus, the stator 12 is fixed in the motor chamber 65. Further, the support shaft 67a, the support shaft 67b, and the shaft pinion 11a are provided such that the axial centers thereof are parallel to each other along a Z direction.

Figure 5:
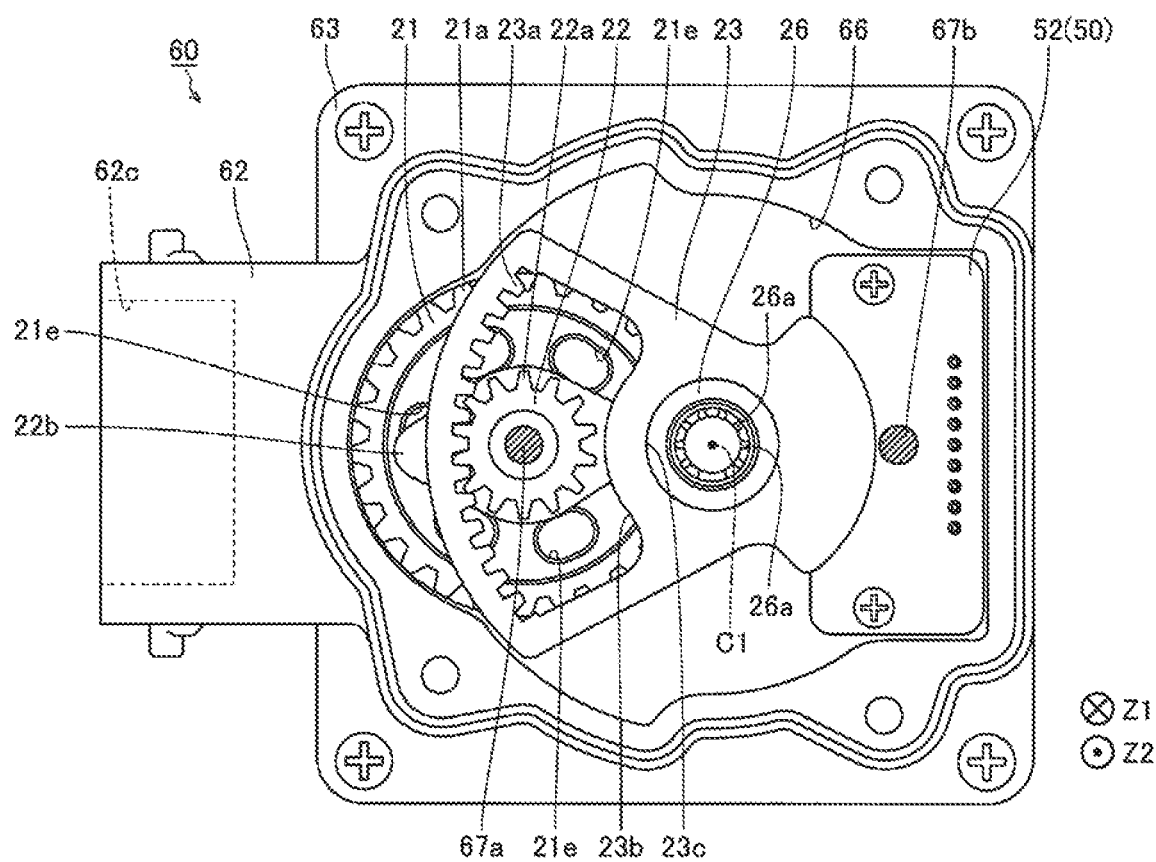
FIG. 5 is a diagram showing an internal structure of a speed reduction mechanism section in a state where a gear housing is removed from a main body portion in the actuator unit constituting the shift device according to the embodiment disclosed here.

The speed reduction mechanism section 20 is configured to rotate the detent plate 71 in a state where the rotation speed transmitted from the motor 10 is reduced. Specifically, as shown in FIGS. 4 and 5, the speed reduction mechanism section 20 includes the gear section 11c of the rotor 11, an intermediate gear 21 that has a gear section 21a meshing with the gear section 11c, an intermediate gear 22 that is disposed on the lower face side (Z2 side) in the same axial center as the intermediate gear 21 and engages with the intermediate gear 21, and a final gear 23 that has a gear section 23a meshing with a gear section 22a of the intermediate gear 22. The intermediate gear 21 (an example of a driving-side member in the claims) is provided on the side of the motor 10 that drives the detent plate 71. Further, the intermediate gear 22 (an example of a driven-side member in the claims) is provided on the detent plate 71 side, and is rotated with the rotation of the intermediate gear 21. Further, the lower end portion of the shaft pinion 11a is supported by the bearing member 2, so that the gear section 11c crosses the gear chamber 66 in the vertical direction (Z direction). The intermediate gear 21 is rotatably supported by a bearing member 4 with respect to the support shaft 67a inserted into the through hole of the motor housing 62. The intermediate gear 22 is rotatably supported by a substantially cylindrical bearing member 5 fitted into the support shaft 67a. The intermediate gear 21 and the intermediate gear 22 are coaxially stacked.

Figure 6:
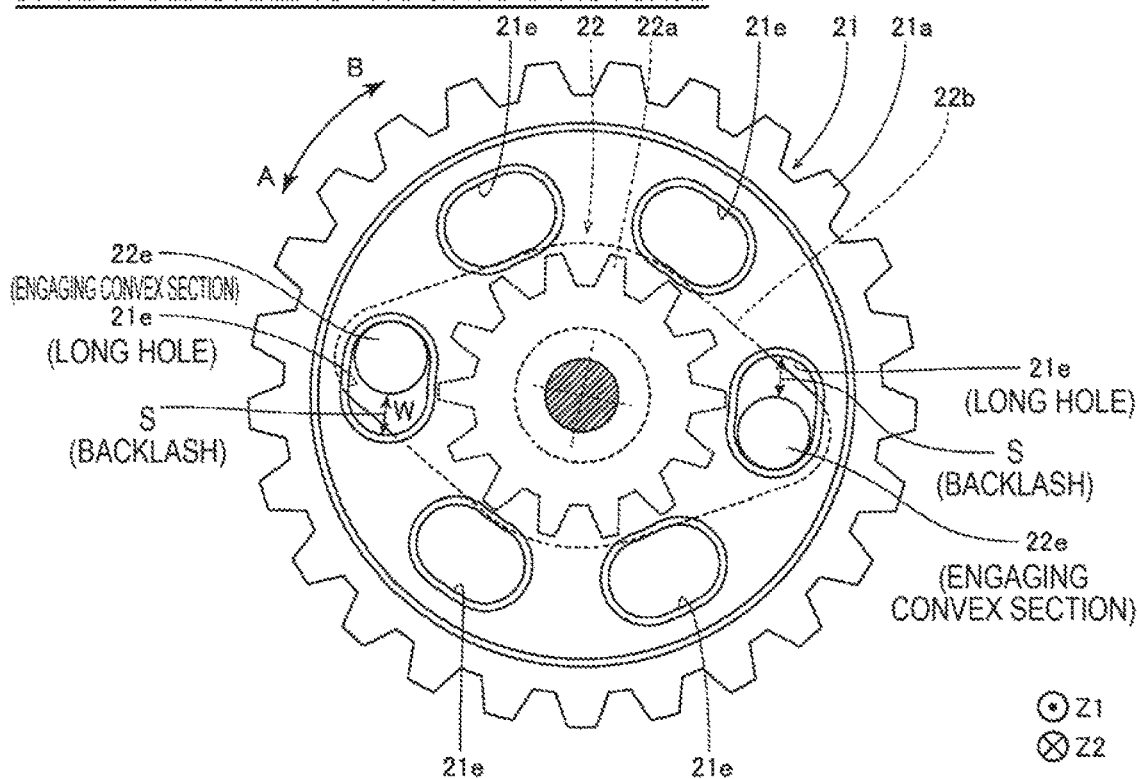
FIG. 6 is a diagram showing an engaged state (state of being able to transmit driving force) of an intermediate gear in the actuator unit constituting the shift device according to the embodiment disclosed here.
Figure 7:
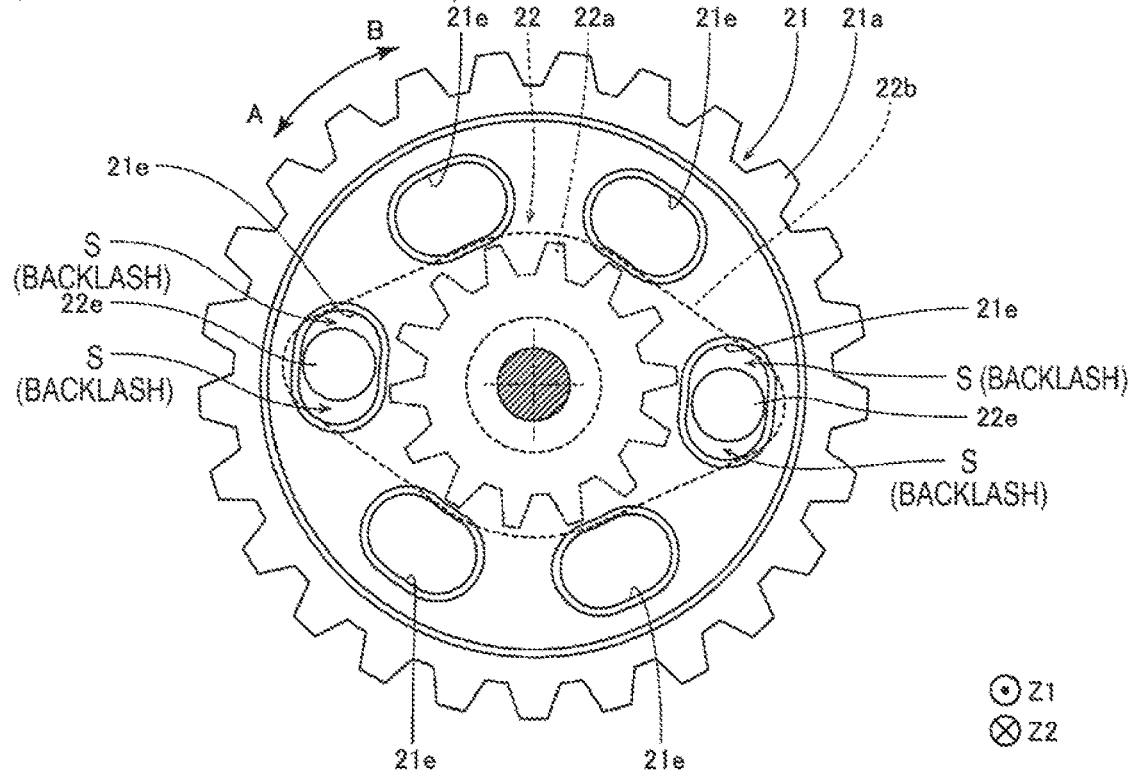
FIG. 7 is a diagram showing an engaged state (state of being unable to transmit driving force) of the intermediate gear in the actuator unit included in the shift device according to the embodiment disclosed here.

As shown in FIGS. 6 and 7, the intermediate gear 21 is provided with a plurality (six) of long holes 21e, of which long diameters extending along a circumferential direction between a rotation center portion and an outer peripheral portion (gear section 21a). The long holes 21e are disposed at intervals of 60° from each other in the circumferential direction. The intermediate gear 22 has an elliptical main body portion 22b provided with a gear section 22a and is provided with a plurality (two) of columnar engaging convex sections 22e protruding upward from an upper face (Z1 side) of the main body portion 22b on a side opposite to the gear section 22a. The engaging convex sections 22e are arranged in a peripheral portion on both sides in a long radial direction in the main body portion 22b. Then, in a state where the intermediate gear 22 is disposed adjacent to the intermediate gear 21 from the lower side to the upper side (Z1 side), each of the engaging convex sections 22e arranged at an interval of 180° is configured so as to be inserted into (engaged with) each of the two long holes 21e of the intermediate gear 21.

The engaging convex section 22e is fitted into the long hole 21e of the intermediate gear 21 through a backlash S having a predetermined size (length in the circumferential direction). That is, as shown in FIG. 7, the intermediate gear 21 and the intermediate gear 22 are configured so as to allow relatively free rotation (free rotation) therebetween by the backlash S (predetermined angle width) in the circumferential direction generated between the engaging convex section 22e and the long hole 21e that are fitted to each other.

Therefore, the intermediate gear 21 and the intermediate gear 22 do not always rotate integrally, and the intermediate gear 21 is configured such that rotation transmitted to the intermediate gear 21 is transmitted to the intermediate gear 22 by allowing the relatively free rotation (free rotation) in one direction (arrow A direction) or the other direction (arrow B direction) at a predetermined angle width. FIG. 6 shows a state where the driving force can be transmitted from the intermediate gear 21 to the intermediate gear 22, and FIG. 7 shows a state where the driving force cannot be transmitted from the intermediate gear 21 to the intermediate gear 22.

As shown in FIG. 5, the gear section 22a of the intermediate gear 22 meshes with the gear section 23a of the fan-shaped final gear 23 that is incorporated so as to be integrally rotated with the output bearing section 26 in a state of having the same rotation axis C1 as the output bearing section 26. The gear section 23a is formed as an internal gear inside a substantially arc-shaped insertion hole 23b provided in the final gear 23 along an outer peripheral edge. The gear section 23a is formed of a gear having a larger diameter than the gear section 22a. In the final gear 23, the output bearing section 26 is fixed to a fitting hole 23c having a rotation center at the position of a fan-shaped "pivot (keystone)". The speed reduction mechanism section 20 is configured such that a speed of the rotation of the shaft pinion 11a is reduced on the output shaft 25 side by the intermediate gear 21, the intermediate gear 22, and the final gear 23.

The speed reduction mechanism section 20 is configured such that the speed reduction ratio is 1:50. That is, when the rotor 11 is rotated 50 times (24×50=1200 conduction step for the motor 10), the output shaft 25 is configured to make one rotation. Therefore, in the motor 10, since the rotor 11 is rotated by 15° in the one conduction step, so that the output shaft 25 is rotated by 0.3° (=15/50).

A plurality of longitudinal groove sections (serrations) 26a extending in the axial direction are formed in the inner periphery of the recess portion at the lower end portion (Z2 side) of the output bearing section 26. Further, a plurality of longitudinal groove sections (serrations) 25a extending in the axial direction are formed on the outer periphery of the upper end portion (Z1 side) of the output shaft 25 (see FIG. 4). Thus, the vertical groove portion 25a of the output shaft 25 is fitted to and connected to the longitudinal groove sections 26a of the output bearing section 26 at an appropriate rotational angle position so that a torque can be transmitted. Therefore, the output shaft 25 in which the detent plate 71 is fixed to the lower end portion (Z2 side) is assembled to the actuator unit 60 at an appropriate rotational angle position.

The rotor rotational angle sensor 30 is configured to detect the rotational angle of the rotor 11. For example, the rotor rotational angle sensor 30 includes a magneto resistive sensor (MR sensor).

The output shaft rotational angle sensor 40 is configured to detect the rotational angle of the detent plate 71 (output shaft 25). For example, the output shaft rotational angle sensor 40 is configured by a Hall element. The rotation position (output angle) of the output shaft 25 is detected as a continuous voltage value.

Next, the relationship between the movement of the shift position and the output values of the output shaft rotational angle sensor 40 and the rotor rotational angle sensor 30 will be described.

Figure 8:
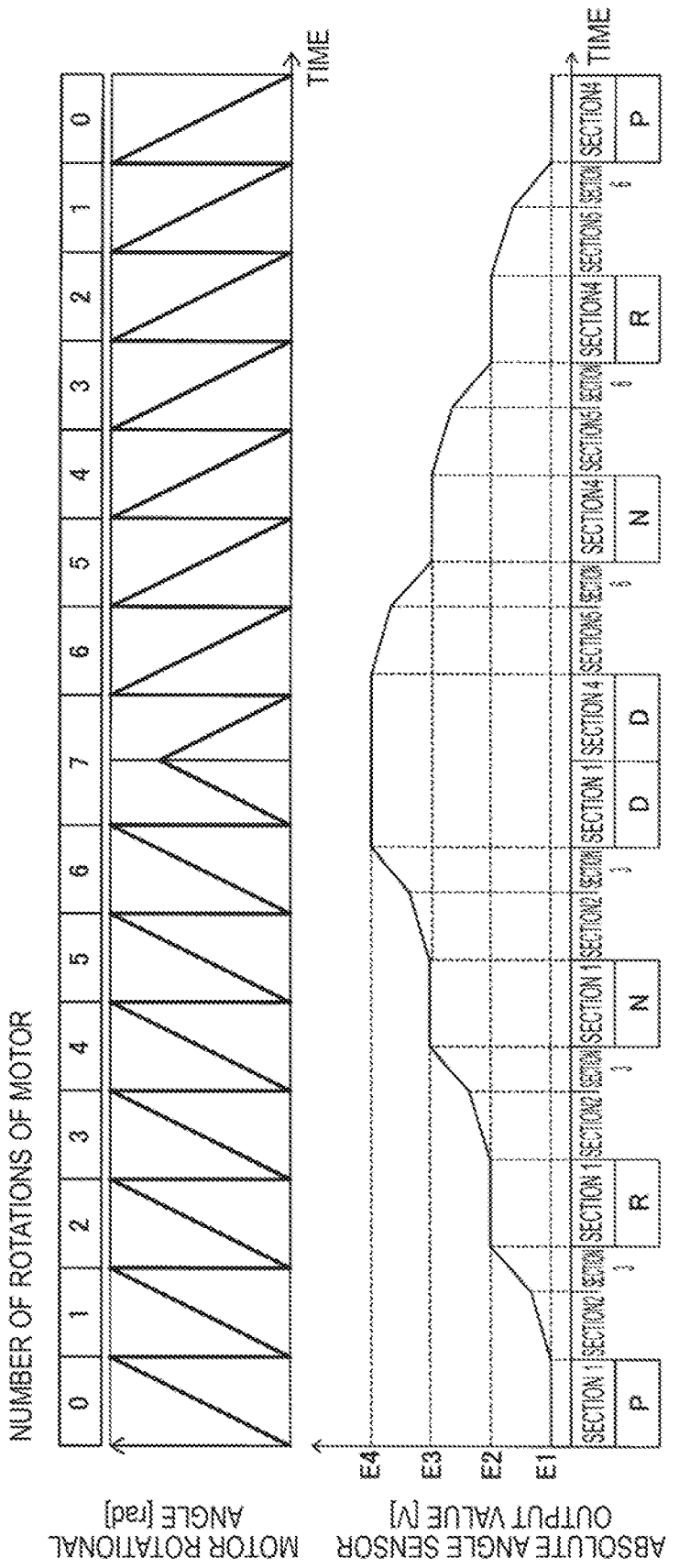
FIG. 8 shows the relationship between the output value (output voltage) of the output shaft rotational angle sensor, the output value of the rotor rotational angle sensor (motor rotational angle), and the number of rotations of a motor in the shift device according to the embodiment disclosed here.

As shown in FIG. 8, as the number of rotations of the motor 10 (0, 1, 2, . . . , 7) increases, the detent plate 71 connected to the output shaft 25 rotates such that the shift position changes in the order of the P position, the R position, the N position, and the D position. At this time, the detent spring 72 fits into the valley parts 80 in the order of the valley parts 81 to 84. The output value of the output shaft rotational angle sensor 40 increases as the number of rotations of the motor 10 increases.

For example, suppose that the roller section 73 is currently fitted into the valley part 81 (P position) (section 1). When the motor 10 (see FIG. 1) is driven, the detent plate 71 is rotated in the direction of arrow A via the speed reduction mechanism section 20 (see FIG. 1). A predetermined amount of backlash S (see FIG. 7) is provided between the intermediate gear 21 and the intermediate gear 22. For this reason, in a state where the roller section 73 is completely fitted into the valley bottom V of the valley part 81 (see section 1 in FIG. 9), although the intermediate gear 21 is rotated with the rotation of the rotor 11, since the engaging convex section 22e is engaged inside the long hole 21e using the backlash S so that the driving force cannot be transmitted, the intermediate gear 22 is not rotated. As a result, in a section 1, while the rotational angle (rad) of the rotor 11 detected by the rotor rotational angle sensor 30 (see FIG. 1) linearly increases, the voltage level corresponding to the rotational angle of the output shaft 25 detected by the output shaft rotational angle sensor 40 (see FIG. 1) is constant.

Then, in a section 2, one end portion of the long hole 21e of the intermediate gear 21 is engaged with the engaging convex section 22e of the intermediate gear 22 so as to be able to transmit driving force (see section 2 in FIGS. 6 and 9), the driving force of the motor 10 is transmitted to the output shaft 25 (see FIG. 2) via the gear section 11c, the intermediate gear 21, the intermediate gear 22, and the final gear 23 (see FIG. 4). As a result, with the rotation of the detent plate 71 in the direction of arrow A, the roller section 73 moves so as to climb the slope of the valley part 81 (P position) on the side of the valley part 82 (R position) toward the peak part 85. The motor 10 is rotated substantially once at the P position (section 1). Then, in the section 2, the rotational angle (rad) of the rotor 11 detected by the rotor rotational angle sensor 30 (see FIG. 1) linearly increases. Further, the voltage level corresponding to the rotational angle of the output shaft 25 detected by the output shaft rotational angle sensor 40 (see FIG. 1) increases at a constant rate. Further, the engaged state of the intermediate gears 21 and 22 in this state corresponds to the state of FIG. 6.

In a section 3, after the roller section 73 has passed over the peak part 85 at the boundary between the valley part 81 (P position) and the valley part 82 (R position), the detent plate 71 is naturally rotated in the direction of arrow A before the motor 10 (intermediate gear 21). That is, since the detent plate 71 is always urged toward the valley part 82 by the roller section 73, by the biasing force F (see FIG. 3), the detent plate 71 is rotated in the direction of arrow A ahead of the motor 10 within the range of the backlash S of the long hole 21e. Then, the roller section 73 is dropped toward the valley bottom V of the valley part 82 (see section 3 in FIG. 9). At this time, while the rotational angle of the rotor 11 increases, the voltage level corresponding to the rotational angle of the output shaft 25 sharply increases as the roller section 73 falls (sucks) into the valley bottom V.

The operation of moving the shift position from the R position to the N position and the operation of moving the N position to the D position are the same as the operation of moving the shift position from the P position to the R position.

The rotating direction of the motor 10 is reversed. As a result, the shift position is moved to the N position via the D position (section 4), a section 5, and a section 6. The operation at the D position (section 4) is the same as the operation in section 1 described above. That is, while the rotational angle (rad) of the rotor 11 detected by the rotor rotational angle sensor 30 (see FIG. 1) linearly decreases, the voltage level corresponding to the rotational angle of the output shaft 25 detected by the output shaft rotational angle sensor 40 (see FIG. 1) is constant. The operation in the section 5 is the same as the operation in the section 2 described above. That is, in the section 5, the rotational angle of the rotor 11 decreases linearly, and the voltage level corresponding to the rotational angle of the output shaft 25 decreases at a constant rate. The operation in the section 6 is the same as the operation in the section 3 described above. That is, while the rotational angle of the rotor 11 decreases, the voltage level corresponding to the rotational angle of the output shaft 25 sharply decreases as the roller section 73 falls (sucks) into the valley bottom V.

Here, in order to improve the positioning accuracy of the detent spring 72 with respect to the detent plate 71 (the valley bottom V of the valley part 80), it is necessary to accurately grasp the rotational angle of the motor 10 (rotor 11) in a state in which the detent spring 72 is located at the valley bottom V of the valley part 80. Therefore, in the shift device 100, for example, at the time of shipment from the factory, the rotational angle of the motor 10 (rotor 11) corresponding to the valley bottom V of the valley part 80 is acquired (learned) for each shift device 100.

Next, the acquisition (learning) of the rotational angle of the motor 10 (rotor 11) corresponding to the valley bottom V (center of backlash S) of the valley part 80 at each of the plurality of shift positions (P position, R position, N position, and D position) will be described. The rotational angle of the motor 10 corresponding to the valley bottom V is acquired by the ECU 50, for example.

Figure 10:
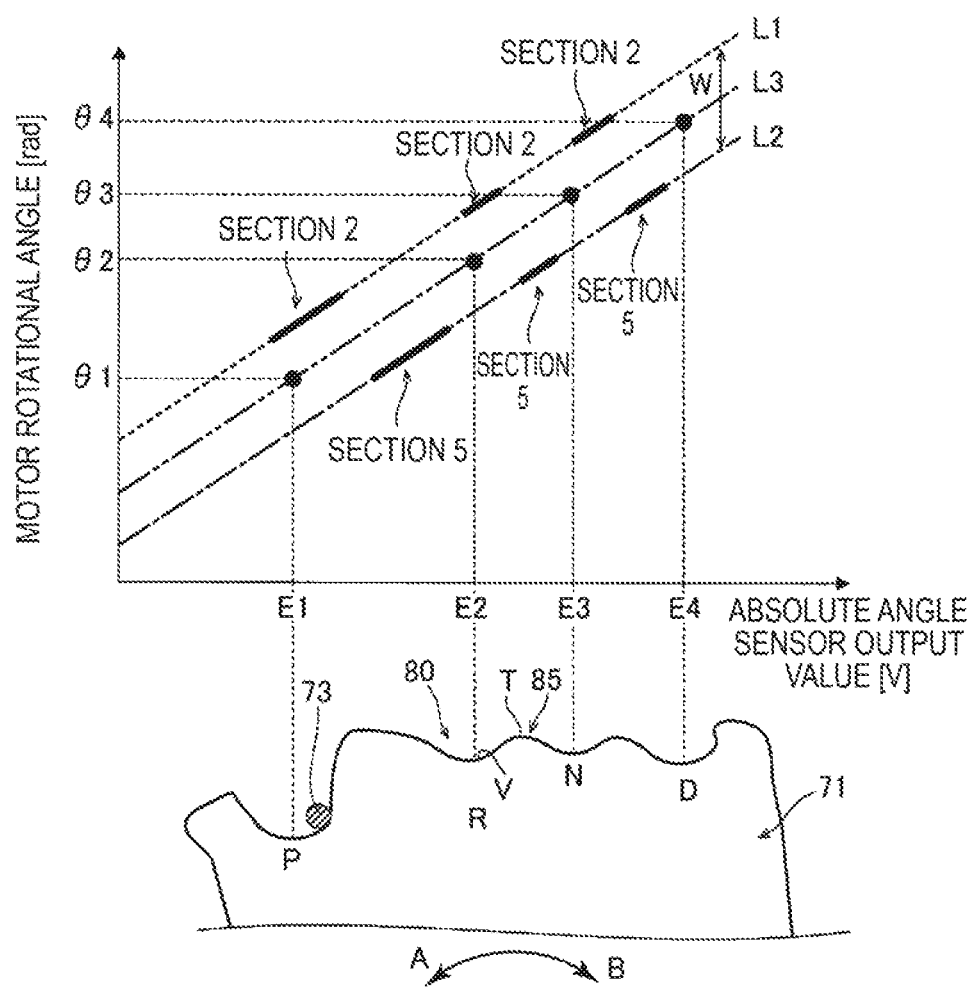
FIG. 10 is a diagram showing a relationship between a first estimated value, a second estimated value, and a center of backlash in the shift device according to the embodiment disclosed here.

In the present embodiment, as shown in FIG. 10, first, the detent spring 72 (roller section 73) is moved so as to continuously pass through the plurality of valley parts 80. The width of the backlash S included in the speed reduction mechanism section 20 is detected based on the output value of the output shaft rotational angle sensor 40 and the output value of the rotor rotational angle sensor 30 during the movement of the detent spring 72. The output value of the output shaft rotational angle sensor 40 is a voltage (V). The output value of the rotor rotational angle sensor 30 is a rotational angle (rad). Further, the detected output value of the output shaft rotational angle sensor 40 and the detected output value of the rotor rotational angle sensor 30 are represented by bold lines in FIG. 10.

Specifically, the detent spring 72 is continuously moved in the order of the P position, the R position, the N position, the D position, the N position, the R position, and the P position. "Continuous" means that the detent spring 72 moves from the P position to the D position without moving in the arrow B direction when moving from the P position to the D position along the arrow A direction. Similarly, "continuous" means that the detent spring 72 moves from the D position to the P position without moving in the arrow A direction when moving from the D position to the P position along the arrow B direction. That is, the detent spring 72 makes one reciprocation in the plurality of valley parts 80 of the detent plate 71. The output value of the output shaft rotational angle sensor 40 and the output value of the rotor rotational angle sensor 30 detected on a forward path in which the detent spring 72 moves in the order of the P position, the R position, the N position, and the D position are represented by bold lines on a straight line L1 in FIG. 10. The output value of the output shaft rotational angle sensor 40 and the output value of the rotor rotational angle sensor 30 detected on a return path in which the detent spring 72 moves in the order of the D position, the N position, the R position, and the P position are represented by bold lines on a straight line L2 in FIG. 10.

In the present embodiment, the width of the backlash S included in the speed reduction mechanism section 20 is detected based on the output value of the output shaft rotational angle sensor 40 and the output value of the rotor rotational angle sensor 30 in a movement section until the detent spring 72 moves from the valley bottom V of the valley part 80 to the top portion T of the peak part 85 of the detent plate 71. As shown in FIG. 6, the width of the backlash S means a width W between the engaging convex section 22e and the long hole 21e in a state where the backlash S is reduced (a state in which the driving force can be transmitted from the intermediate gear 21 to the intermediate gear 22).

Figure 9:
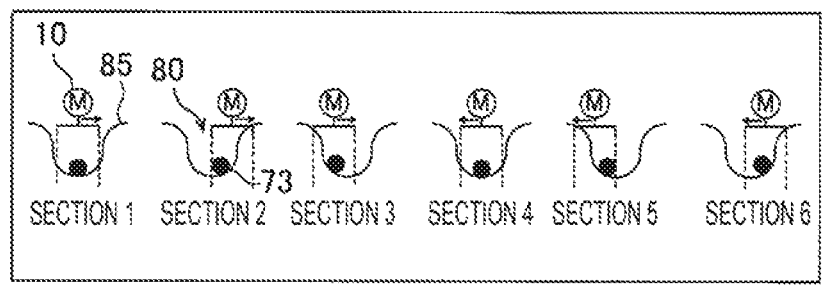
FIG. 9 is a diagram showing a relationship between a rotary shaft and an output shaft of the motor.

As shown in FIG. 9, the movement section (section 1 and section 5) until the detent spring 72 moves from the valley bottom V of the valley part 80 of the detent plate 71 to the top portion T of the peak part 85 is a state in which the backlash S between the intermediate gear 21 and the intermediate gear 22 is reduced (see FIG. 6), and is a section in which the intermediate gear 22 rotates with the rotation of the intermediate gear 21. Further, the movement section until the detent spring 72 moves from the valley bottom V to the top portion T includes the section 2 when the detent plate 71 is rotated in the direction of arrow A, and the section 5 when the detent plate 71 is rotated in the direction of arrow B.

In the present embodiment, as shown in FIG. 10, the width of the backlash S is detected based on the output value of the output shaft rotational angle sensor 40 and the output value of the rotor rotational angle sensor 30 in the movement section when the motor 10 is rotated in the direction of arrow A (an example of a first direction in the claims) and when the motor 10 is rotated in the direction of arrow B opposite to the direction of arrow A (an example of a second direction in the claims). Specifically, as described above, the width of the backlash S is detected based on the output value of the output shaft rotational angle sensor 40 and the output value of the rotor rotational angle sensor 30 in the section 2 in a state of the backlash S being reduced when the motor 10 is rotated in the direction of the arrow A and the section 5 in a state of the backlash S being reduced when the motor 10 is rotated in the direction of the arrow B. The section 2 includes a section 2 when the detent spring 72 moves from the P position to the R position, a section 2 when the detent spring 72 moves from the R position to the N position, and a section 2 when the detent spring 72 moves from the N position to the D position. The section 5 includes a section 5 when the detent spring 72 moves from the D position to the N position, a section 5 when the detent spring 72 moves from the N position to the R position, and a section 5 when the detent spring 72 moves from the R position to the P position.

In the present embodiment, a first estimated value of the rotor rotational angle sensor 30 with respect to the output value of the output shaft rotational angle sensor 40 is calculated from the output value of the output shaft rotational angle sensor 40 and the output value of the rotor rotational angle sensor 30 in a plurality of movement sections when the motor 10 is rotated in the direction of arrow A. Specifically, the first estimated value is calculated from the output value of the output shaft rotational angle sensor 40 and the output value of the rotor rotational angle sensor 30 in the three section 2's (section 2 when the detent spring 72 moves from the P position to the R position, section 2 when moving from the R position to the N position, and section 2 when moving from the N position to the D position) when the motor 10 is rotated in the direction of arrow A.

In detail, in the present embodiment, the first estimated value is calculated by linearly approximating the output value of the rotor rotational angle sensor 30 with respect to the output value of the output shaft rotational angle sensor 40 in the plurality of movement sections (three section 2's, bold line on the straight line L1 in FIG. 10) when the motor 10 is rotated in the direction of arrow A. That is, with the horizontal axis representing the output value (voltage) of the output shaft rotational angle sensor 40 and the vertical axis representing the output value (rotational angle) of the rotor rotational angle sensor 30, the relationship between the voltage (V) and the rotational angle (rad) in three section 2's is linearly approximated. Thereby, the straight line L1 is acquired as the first estimated value. That is, a slope (hereinafter, referred to as a1) and an intercept (hereinafter, referred to as b1) of the straight line L1 are calculated. Actually, the vertical axis represents the integrated value of the rotational angle of the motor 10 (that is, $2\pi \times$ the number of rotations of the motor 10+the rotational angle).

In the present embodiment, a second estimated value of the rotor rotational angle sensor 30 with respect to the output value of the output shaft rotational angle sensor 40 is calculated from the output value of the output shaft rotational angle sensor 40 and the output value of the rotor rotational angle sensor 30 in a plurality of movement sections when the motor 10 is rotated in the direction of arrow B. Specifically, the second estimated value is calculated from the output value of the output shaft rotational angle sensor 40 and the output value of the rotor rotational angle sensor 30 in the three section 5's (section 5 when the detent spring 72 moves from the D position to the N position, section 5 when moving from the N position to the R position, and section 5 when moving from the R position to the P position) when the motor 10 is rotated in the direction of arrow B.

In detail, in the present embodiment, the second estimated value is calculated by linearly approximating the output value of the rotor rotational angle sensor 30 with respect to the output value of the output shaft rotational angle sensor 40 in the plurality of movement sections (three section 5's) when the motor 10 is rotated in the direction of arrow B. That is, with the horizontal axis representing the output value (voltage) of the output shaft rotational angle sensor 40 and the vertical axis representing the output value (rotational angle) of the rotor rotational angle sensor 30, the relationship between the voltage (V) and the rotational angle (rad) in three section 5's is linearly approximated. Thereby, the straight line L2 is acquired as the second estimated value. That is, a slope (hereinafter, referred to as a2) and an intercept (hereinafter, referred to as b2) of the straight line L2 are calculated.

In the present embodiment, the difference between the first estimated value and the second estimated value is detected as the width of the backlash S, and the central value of the width of the backlash S is set as the center of the backlash S. The width of the backlash S is the width of a predetermined amount of the backlash S (see FIG. 6) provided in advance between the intermediate gear 21 and the intermediate gear 22. Specifically, the width W between the first estimated value (straight line L1) calculated by the linear approximation and the second estimated value (straight line L2) calculated by the linear approximation is detected as the width of the backlash S. That is, since a predetermined amount of backlash S is provided between the intermediate gear 21 and the intermediate gear 22 in advance, even with the same output value (horizontal axis) of the output shaft rotational angle sensor 40, a difference occurs in the rotational angle (vertical axis) of the motor 10. This difference can be regarded as the width of the backlash S.

In the present embodiment, the rotational angle of the rotor 11 corresponding to the center of the backlash S is calculated based on the detected width of the backlash S. Specifically, the state at the center (that is, the center of the width of the backlash S) between the state where the backlash S is reduced when the motor 10 is rotated in the direction of the arrow A and the state where the backlash S is reduced when the motor 10 is rotated in the direction of the arrow B can be regarded as the center of the backlash S. That is, a straight line L3 as the center of the backlash S, which passes through the center between the straight line L1 as the first estimated value and the straight line L2 as the second estimated value, is acquired as the rotational angle of the rotor 11 corresponding to the center of the backlash S. That is, a slope (hereinafter, referred to as a3) and an intercept (hereinafter, referred to as b3) of the straight line L3 are calculated. The straight line L3 represents the relationship between the output value of the output shaft rotational angle sensor 40 and the output value of the rotor rotational angle sensor 30 (the rotational angle of the rotor 11) corresponding to the center of the backlash S.

In the present embodiment, the rotational angle of the motor 10 corresponding to the center of the backlash S is acquired based on the association between the calculated rotational angle of the rotor 11 corresponding to the center of the backlash S and the output value of the output shaft rotational angle sensor 40 corresponding to the valley bottom V of the valley part 80. Specifically, the output values of the output shaft rotational angle sensor 40 in a plurality of section 1's (section 1's corresponding to the P position, the R position, the N position, and the D position) when the motor 10 is rotated in the direction of arrow A are acquired. In each of the plurality of section 1's, the output value of the output shaft rotational angle sensor 40 is a constant value. Specifically, the output values of the output shaft rotational angle sensor 40 corresponding to each of the P position, the R position, the N position, and the D position are E1, E2, E3, and E4, respectively.

Further, the output values of the output shaft rotational angle sensor 40 in a plurality of section 4's (section 4's corresponding to the D position, the N position, the R position, and the P position) when the motor 10 is rotated in the direction of arrow B are acquired. In each of the plurality of section 4's, the output value of the output shaft rotational angle sensor 40 becomes a constant value. Specifically, the output values of the output shaft rotational angle sensor 40 corresponding to each of the D position, the N position, the R position, and the P position are E4, E3, E2, and E1, respectively. That is, at the same shift position, the output value of the output shaft rotational angle sensor 40 in section 1 and the output value of the output shaft rotational angle sensor 40 in the section 4 are substantially the same.

Then, on the straight line L3, the rotational angle of the motor 10 corresponding to the section 1 (or section 4) is acquired. Specifically, the rotational angles θ1, θ2, θ3, and θ4 of the motor 10 corresponding to the output values E1, E2, E3, and E4 of the output shaft rotational angle sensor 40 are acquired. As a result, the rotational angles θ1, θ2, θ3, and θ4 of the motor 10 corresponding to the valley bottom V (center of the backlash S) at each of the P position, the R position, the N position, and the D position are acquired. As described above, since the vertical axis in FIG. 10 represents the integrated value of the rotational angle of the motor 10 (=2π×the number of rotations of the motor 10+the rotational angle), the number of rotations of the motor 10 and the rotational angle at the number of rotations corresponding to the valley bottom V (the center of the backlash S) at each of the P position, the R position, the N position, and the D position are acquired.

In the present embodiment, the linearly approximated first estimated value (straight line L1), the linearly approximated second estimated value (straight line L2), a center (straight line L3) of the backlash S, which is a central value between the linearly approximated first estimated value and the linearly approximated second estimated value, and an output value of the output shaft rotational angle sensor 40 and an output value of the rotor rotational angle sensor 30 corresponding to the center of the backlash S are stored in the nonvolatile storage section 90 (see FIG. 1). Specifically, the slopes (a1, a2, and a3) and intercepts (b1, b2, and b3) of each of the straight lines L1, L2, and L3, and the output values (E1, E2, E3, and E4) of the output shaft rotational angle sensor 40 and the rotational angles (θ1, θ2, θ3, and θ4) of the motor 10 corresponding to the valley bottom V (center of backlash S) at each of the P position, the R position, the N position, and the D position are stored.

In the present embodiment, when detecting the width of the backlash S, the detent spring 72 is moved so as to continuously pass through the plurality of valley parts 80 so as not to collide with the wall portions 81a and 84a (see FIG. 3). Hereinafter, control for preventing the detent spring 72 from colliding with the wall portions 81a and 84a will be described. First, in a state where the detent plate 71 is located at the valley part 84 at the D position, the detent plate 71 is rotated in the direction of the arrow A. At this time, if the output value of the output shaft rotational angle sensor 40 is within a predetermined range (that is, if the output value of the output shaft rotational angle sensor 40 is substantially constant), the backlash S is not reduced, and thereby the rotation of the detent plate 71 is continued. That is, since the detent plate 71 is located near the valley bottom V, the rotation of the detent plate 71 is continued. Thereafter, when the output value of the output shaft rotational angle sensor 40 exceeds a predetermined range, since the backlash S is reduced and the detent plate 71 approaches the wall portion 84a, the rotation of the detent plate 71 is stopped. Thereby, the collision of the detent plate 71 with the wall portion 84a is suppressed.

Similarly, in a state where the detent plate 71 is located at the valley part 81 at the P position, the detent plate 71 is rotated in the direction of the arrow B. At this time, if the output value of the output shaft rotational angle sensor 40 is within a predetermined range (that is, if the output value of the output shaft rotational angle sensor 40 is substantially constant), the backlash S is not reduced, and thereby the rotation of the detent plate 71 is continued. That is, since the detent plate 71 is located near the valley bottom V, the rotation of the detent plate 71 is continued. Thereafter, when the output value of the output shaft rotational angle sensor 40 exceeds a predetermined range, since the backlash S is reduced and the detent plate 71 approaches the wall portion 81a, the rotation of the detent plate 71 is stopped. Thereby, the collision of the detent plate 71 with the wall portion 81a is suppressed.

Figure 11:
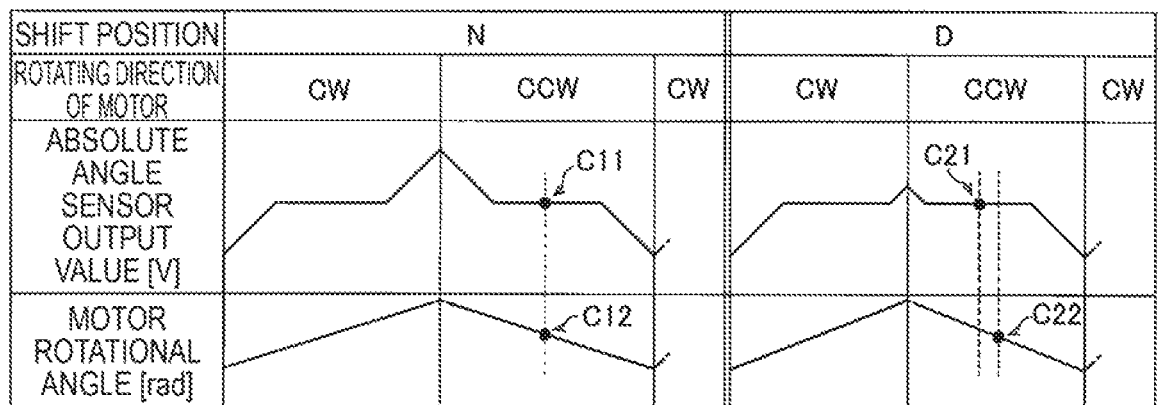
FIG. 11 is a diagram showing a relationship between an output value of an output shaft rotational angle sensor and an output value of a rotor rotational angle sensor.

As shown in FIG. 11, in the valley part 83 at the N position where no wall portion is provided, in the method of rotating the motor 10 a plurality of times in the forward direction (CW) and the reverse direction (CCW) as in JP 2016-75364A, a center C11 of the backlash S based on the output value of the output shaft rotational angle sensor 40 (the center of the portion where the output value is flat) substantially coincides with a center C12 of the backlash S based on the output value of the rotor rotational angle sensor 30 (the center of the rotational angle of the motor 10 when the motor 10 is rotating in the reverse direction (CCW)). Thereby, the center of the backlash S can be acquired relatively accurately. Similarly, the center of the backlash S can be acquired relatively accurately also at the valley part 82 at the R position where no wall portion is provided.

On the other hand, since the wall portion 84a is provided in the valley part 84 at the position D, the detent spring 72 cannot climb the wall portion 84a. Therefore, even when the backlash S is reduced, the change in the output value of the output shaft rotational angle sensor 40 is small (substantially constant). Therefore, in the method of JP 2016-75364A, a center C21 of the backlash S based on the output value of the output shaft rotational angle sensor 40 (the center of the portion where the output value is flat) does not coincide with a center C22 of the backlash S based on the output value of the rotor rotational angle sensor 30 (the center of the rotational angle of the motor 10 when the motor 10 is rotating in the reverse direction (CCW)). For this reason, it is difficult to accurately acquire the center of the backlash S (the rotational angle of the motor 10 corresponding to the center of the backlash S). On the other hand, in the present embodiment, as described above, the detent spring 72 is continuously passed through the plurality of valley parts 80, and the center of the backlash S is acquired based on the first estimated value and the second estimated value, so that the center of the backlash S is acquired (learned) while suppressing the influence of the wall portions 81a and 84a. Thereby, the center of the backlash S can be acquired accurately.

In the present embodiment, the following effects can be obtained.

In the present embodiment, as described above, unlike the case where the width of the backlash S is detected for each of the plurality of valley parts 80 and the rotational angle of the motor 10 corresponding to the center of the backlash S is acquired based on the width of the backlash S detected for each of the plurality of valley parts 80, the rotational angle of the motor 10 corresponding to the center of the backlash S (corresponding to the valley bottom V of each valley part 80) can be acquired based on the width of the backlash S that is commonly detected for the plurality of valley parts 80. That is, unlike the case where the motor 10 is rotated a plurality of times in the forward direction and the reverse direction for each valley part 80 to detect the width of the backlash S for each of the plurality of valley parts 80, the operation of the detent spring 72 is simplified (the detent spring 72 is continuously passed through the plurality of valley parts 80), so that the tact time for acquiring the rotational angle of the motor 10 corresponding to the valley bottom V (the center of the backlash S) of the plurality of valley parts 80 of the detent plate 71 can be reduced.

In the present embodiment, as described above, since the output shaft 25 rotates without preceding the rotation of the motor 10 moving from the valley bottom V of the valley part 80 to the top portion T of the peak part 85 of the detent plate 71, the output value of the output shaft rotational angle sensor 40 corresponds to the output value of the rotor rotational angle sensor 30. Thereby, the width of the backlash S included in the speed reduction mechanism section 20 can be accurately detected.

In the present embodiment, as described above, the width of the backlash S can be detected based on the difference between the relationship between the output value of the output shaft rotational angle sensor 40 and the output value of the rotor rotational angle sensor 30 on the forward path and the relationship between the output value of the output shaft rotational angle sensor 40 and the output value of the rotor rotational angle sensor 30 on the return path. That is, the width of the backlash S can be detected by one reciprocating operation of the detent spring 72. As a result, the rotational angle of the motor 10 corresponding to the center of the backlash S (corresponding to the valley bottom V of the valley part 80) can be easily acquired while simplifying the operation of the detent spring 72.

In the present embodiment, as described above, the width of the backlash S can be easily detected by calculation based on the difference between the first estimated value and the second estimated value.

In the present embodiment, as described above, the rotational angle of the motor 10 corresponding to the position of the valley bottom V of the valley part 80 can be acquired without pressing the detent spring 72 against the wall portions 81a and 84a of the detent plate 71, so that it is possible to prevent the durability of the detent plate 71 from decreasing.

In the present embodiment, as described above, by providing a predetermined amount of backlash S (for example, a backlash S larger than unintentional backlash) in advance, the rotational angle of the motor 10 corresponding to the center of the backlash S (the valley bottom V of the valley part 80) can be accurately calculated even when the detent spring 72 passes through the plurality of valley parts 80 at high speed. Thereby, the tact time for acquiring the rotational angle of the motor 10 corresponding to the valley bottom V of the plurality of valley parts 80 of the detent plate 71 can be further reduced.

In the present embodiment, as described above, the first estimated value and the second estimated value can be easily calculated by linear approximation.

In the present embodiment, as described above, the detent spring 72 can be easily positioned with respect to the detent plate 71 with high accuracy with reference to the first estimated value, the second estimated value, the center of the backlash S, and an output value of the output shaft rotational angle sensor 40 and an output value of the rotor rotational angle sensor 30 corresponding to the center of the backlash S stored in the nonvolatile storage section 90.

MODIFICATION EXAMPLE

It should be understood that the embodiment disclosed this time is to be considered in all respects as illustrative and not restrictive. The scope of this disclosure is defined by the terms of the claims, rather than the description of the embodiments, and includes all equivalents (modifications) within the scope and meaning equivalent to the claims.

For example, in the above-described embodiment, an example is described in which the detent spring 72 moves (reciprocates) continuously in the order of the P position, the R position, the N position, the D position, the N position, the R position, and the P position, but this disclosure is not limited to this. For example, the detent spring 72 may not move in all shift positions. That is, it is also possible to acquire the rotational angle of the motor 10 corresponding to the center of the backlash S by reciprocating two or three of the four shift positions. Further, even when the detent spring 72 moves in all shift positions, it may move in an order different from the above-described order.

In the above-described embodiment, an example is described in which the first estimated value and the second estimated value are calculated based on linear approximation, but this disclosure is not limited to this. For example, the first estimated value and the second estimated value may be calculated by a method other than linear approximation (such as polynomial approximation).

In the above-described embodiment, an example is described in which the wall portion 81a and the wall portion 84a are provided in the valley part 81 at the P position and the valley part 84 at the D position, respectively, but this disclosure is not limited to this. This disclosure can be applied to a shift device in which the valley parts 80 are not provided with the wall portions 81a and 84a.

In the above-described embodiment, an example is described in which the detent spring 72 is moved so as to continuously pass through the plurality of valley parts 80 so that the detent springs 72 do not collide with the wall portions 81a and 84a, but this disclosure is not limited to this. This disclosure can be applied even when the detent spring 72 collides with the wall portions 81a and 84a.

In the above-described embodiment, an example is described in which a predetermined amount of backlash S is provided in advance between the intermediate gear 21 and the intermediate gear 22, but this disclosure is not limited to this. This disclosure can be applied even when a predetermined amount of backlash S is not provided between the intermediate gear 21 and the intermediate gear 22 (when only unintended backlash such as an assembly error occurs).

In the above-described embodiment, an example is described in which the number of shift positions is four (P, R, N, and D), but this disclosure is not limited to this. For example, disclosed here can be applied to a shift device having a number other than four.

In the above-described embodiment, an example is described in which the shift device 100 disclosed here is applied to a shift device for an automobile, but this disclosure is not limited to this. The shift device disclosed here may be applied to, for example, a shift device other than for a car, such as a train.

A shift device according to an aspect of this disclosure is configured to be mounted on a vehicle, and includes a shift switching member that includes a plurality of valley parts corresponding to a shift position, a positioning member that is provided to establish the shift position in a state of being fitted into any one of the plurality of valley parts of the shift switching member, a motor including a rotor and a stator and driving the shift switching member, a speed reduction mechanism section that rotates the shift switching member in a state in which a rotation speed transmitted from the motor is reduced, a rotor rotational angle sensor that detects a rotational angle of the rotor, and an output shaft rotational angle sensor that detects a rotational angle of the shift switching member, in which a width of a backlash included in the speed reduction mechanism section is detected based on an output value of the output shaft rotational angle sensor and an output value of the rotor rotational angle sensor while moving the positioning member so as to continuously pass through the plurality of valley parts, and the rotational angle of the rotor corresponding to a center of the backlash is calculated based on the detected width of the backlash, and the rotational angle of the motor corresponding to the center of the backlash is acquired based on association between the calculated rotational angle of the rotor corresponding to the center of the backlash and the output value of the output shaft rotational angle sensor corresponding to a valley bottom of the valley part.

In the shift device according to the aspect of this disclosure, as described above, a width of a backlash included in the speed reduction mechanism section is detected based on an output value of the output shaft rotational angle sensor and an output value of the rotor rotational angle sensor while moving the positioning member so as to continuously pass through the plurality of valley parts, and the rotational angle of the rotor corresponding to a center of the backlash is calculated based on the detected width of the backlash, and the rotational angle of the motor corresponding to the center of the backlash is acquired based on association between the calculated rotational angle of the rotor corresponding to the center of the backlash and the output value of the output shaft rotational angle sensor corresponding to a valley bottom of the valley part. Thereby, unlike the case where the width of the backlash is detected for each of the plurality of valley parts and the rotational angle of the motor corresponding to the center of the backlash is acquired based on the width of the backlash detected for each of the plurality of valley parts, the rotational angle of the motor corresponding to the center of the backlash (corresponding to the valley bottom of each valley part) can be acquired based on the width of the backlash that is commonly detected for the plurality of valley parts. That is, unlike the case where the motor is rotated a plurality of times in the forward direction and the reverse direction for each valley part to detect the width of the backlash for each of the plurality of valley parts, the operation of the positioning member is simplified (the positioning member is continuously passed through the plurality of valley parts), so that the tact time for acquiring the rotational angle of the motor corresponding to the valley bottom (the center of the backlash) of the plurality of valley parts of the shift switching member can be reduced.

In the shift device according to the aspect of this disclosure, it is preferable that the width of the backlash included in the speed reduction mechanism section is detected based on the output value of the output shaft rotational angle sensor and the output value of the rotor rotational angle sensor in a movement section until the positioning member moves from the valley bottom of the valley part to a top portion of a peak part of the shift switching member.

When the positioning member has a biasing force, the positioning member moves from the top portion of the peak part of the shift switching member to the valley bottom of the valley part prior to rotation of the motor. In this case, while the output value of the output shaft rotational angle sensor changes rapidly, the rate of change of the rotational angle of the motor is constant. That is, the output value of the output shaft rotational angle sensor may not correspond to the rotational angle of the motor in some cases. Therefore, by configuring as described above, since the output shaft rotates without preceding the rotation of the motor in a period of moving from the valley bottom of the valley part of the shift switching member to the top portion of the peak part, the output value of the output shaft rotational angle sensor corresponds to the output value of the rotor rotational angle sensor. Thereby, the width of the backlash included in the speed reduction mechanism section can be accurately detected.

In the shift device according to the aspect of this disclosure, it is preferable that the width of the backlash is detected based on the output value of the output shaft rotational angle sensor and the output value of the rotor rotational angle sensor in the movement section when the motor is rotated in a first direction and when the motor is rotated in a second direction opposite to the first direction.

With this configuration, the width of the backlash can be detected based on a difference between the relationship between the output value of the output shaft rotational angle sensor and the output value of the rotor rotational angle sensor on the forward path and the relationship between the output value of the output shaft rotational angle sensor and the output value of the rotor rotational angle sensor on the return path. That is, the width of the backlash can be detected by one reciprocating operation of the positioning member. As a result, the rotational angle of the motor corresponding to the center of the backlash (corresponding to the valley bottom of the valley part) can be easily acquired while simplifying the operation of the positioning member.

In this case, it is preferable that a difference between a first estimated value of the rotational angle of the rotor with respect to the output shaft rotational angle sensor calculated from the output value of the output shaft rotational angle sensor and the output value of the rotor rotational angle sensor in a plurality of the movement sections when the motor is rotated in the first direction and a second estimated value of the rotational angle of the rotor with respect to the output shaft rotational angle sensor calculated from the output value of the output shaft rotational angle sensor and the output value of the rotor rotational angle sensor in the plurality of movement sections when the motor is rotated in the second direction is detected as the width of the backlash, and a central value of the width of the backlash is defined as the center of the backlash.

With this configuration, the width of the backlash can be easily detected by calculation based on the difference between the first estimated value and the second estimated value.

In the shift device according to the aspect of this disclosure, it is preferable that an end portion side valley part disposed at a most end portion side of the plurality of valley parts included in the shift switching member is provided with a wall portion that suppresses the positioning member from moving beyond the end portion side valley part, and the positioning member is moved so as to continuously pass through the plurality of valley parts so as not to collide with the wall portion.

With this configuration, the rotational angle of the motor corresponding to the position of the valley bottom of the valley part can be acquired without pressing the positioning member against the wall portion of the shift switching member, so that it is possible to prevent the durability of the shift switching member from decreasing.

In the present application, the following configuration is also conceivable in the shift device according to the above-described aspect.

APPENDIX 1

That is, in the shift device according to the aspect of this disclosure, the speed reduction mechanism section may include a driving-side member provided on a side of the motor that drives the shift switching member and a driven-side member provided on a side of the shift switching member and is rotated with a rotation of the driving-side member, a predetermined amount of a backlash may be provided between the driving-side member and the driven-side member in advance, and a width of the predetermined amount of the backlash provided between the driving-side member and the driven-side member may be detected by moving the positioning member so as to continuously pass through the plurality of valley parts.

Here, it is necessary to pass the positioning member through a plurality of valley parts at a low speed in order to accurately detect the presence or absence of relatively small backlash in order to accurately calculate the rotational angle of the rotor corresponding to the center (valley bottom of the valley part) of the backlash using relatively small backlash caused by unintentionally assembly error and the like. Therefore, as described above, by providing a predetermined amount of backlash (for example, a backlash larger than unintentional backlash) in advance, the rotational angle of the motor corresponding to the center of the backlash (the valley bottom of the valley part) can be accurately calculated even when the positioning member passes through the plurality of valley parts at high speed. Thereby, the tact time for acquiring the rotational angle of the motor corresponding to the valley bottom of the plurality of valley parts of the shift switching member can be further reduced.

APPENDIX 2

In the shift device that detects the difference between the first estimated value and the second estimated value as a width of the backlash, the first estimated value may be calculated by linearly approximating the output value of the rotor rotational angle sensor with respect to the output value of the output shaft rotational angle sensor in the plurality of movement sections when the motor is rotated in the first direction, and the second estimated value may be calculated by linearly approximating the output value of the rotor rotational angle sensor with respect to the output value of the output shaft rotational angle sensor in the plurality of movement sections when the motor is rotated in the second direction.

With this configuration, the first estimated value and the second estimated value can be easily calculated by linear approximation.

APPENDIX 3

The shift device in which the first estimated value and the second estimated value are calculated by linear approximation may further include a nonvolatile storage section that stores, the linearly approximated first estimated value, the linearly approximated second estimated value, the center of the backlash which is a central value between the linearly approximated first estimated value and the linearly approximated second estimated value, and the output value of the output shaft rotational angle sensor and the output value of the rotor rotational angle sensor corresponding to the center of the backlash.

With this configuration, the positioning member can be easily positioned with respect to the shift switching member with high accuracy with reference to the first estimated value, the second estimated value, the center of the backlash, and an output value of the output shaft rotational angle sensor and an output value of the rotor rotational angle sensor corresponding to the center of the backlash stored in the nonvolatile storage section.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift device configured to be mounted on a vehicle, the shift device comprising:
   a shift switching member that includes a plurality of valley parts corresponding to a shift position;
   a positioning member that is provided to establish the shift position in a state of being fitted into any one of the plurality of valley parts of the shift switching member;
   a motor including a rotor and a stator and driving the shift switching member;
   a speed reduction mechanism section that rotates the shift switching member in a state in which a rotation speed transmitted from the motor is reduced;
   a rotor rotational angle sensor that detects a rotational angle of the rotor; and
   an output shaft rotational angle sensor that detects a rotational angle of the shift switching member, wherein
   a width of a backlash included in the speed reduction mechanism section is detected based on an output value of the output shaft rotational angle sensor and an output value of the rotor rotational angle sensor while moving the positioning member so as to continuously pass through the plurality of the valley parts by moving in one direction without reciprocating to another direction while passing through the plurality of valley parts, and
   the rotational angle of the rotor corresponding to a center of the backlash is calculated based on the detected width of the backlash, and the rotational angle of the motor corresponding to the center of the backlash is acquired based on association between the calculated rotational angle of the rotor corresponding to the center of the backlash and the output value of the output shaft rotational angle sensor corresponding to a valley bottom of the valley part.

2. The shift device according to claim 1, wherein the width of the backlash included in the speed reduction mechanism section is detected based on the output value of the output shaft rotational angle sensor and the output value of the rotor rotational angle sensor in a movement section until the positioning member moves from the valley bottom of the valley part to a top portion of a peak part of the shift switching member.

3. The shift device according to claim 1, wherein the width of the backlash is detected based on the output value of the output shaft rotational angle sensor and the output value of the rotor rotational angle sensor in a movement section when the motor is rotated in a first direction and when the motor is rotated in a second direction opposite to the first direction.

4. The shift device according to claim 3, wherein
a difference between a first estimated value of the rotational angle of the rotor with respect to the output shaft rotational angle sensor calculated from the output value of the output shaft rotational angle sensor and the output value of the rotor rotational angle sensor in a plurality of the movement sections when the motor is rotated in the first direction, and a second estimated value of the rotational angle of the rotor with respect to the output shaft rotational angle sensor calculated from the output value of the output shaft rotational angle sensor and the output value of the rotor rotational angle sensor in the plurality of movement sections when the motor is rotated in the second direction is detected as the width of the backlash, and
a central value of the width of the backlash is defined as the center of the backlash.

5. The shift device according to claim 1, wherein
an end portion side valley part disposed at a most end portion side of the plurality of valley parts included in the shift switching member is provided with a wall portion that suppresses the positioning member from moving beyond the end portion side valley part, and
the positioning member is moved so as to continuously pass through the plurality of valley parts so as not to collide with the wall portion.

6. The shift device according to claim 1, wherein
the speed reduction mechanism section includes a driving-side member provided on a side of the motor that drives the shift switching member and a driven-side member provided on a side of the shift switching member and is rotated with a rotation of the driving-side member,
a predetermined amount of a backlash is provided between the driving-side member and the driven-side member in advance, and
a width of the predetermined amount of the backlash provided between the driving-side member and the driven-side member is detected by moving the positioning member so as to continuously pass through the plurality of valley parts.

7. The shift device according to claim 4, wherein
the first estimated value is calculated by linearly approximating the output value of the rotor rotational angle sensor with respect to the output value of the output shaft rotational angle sensor in the plurality of movement sections when the motor is rotated in the first direction, and
the second estimated value is calculated by linearly approximating the output value of the rotor rotational angle sensor with respect to the output value of the output shaft rotational angle sensor in the plurality of movement sections when the motor is rotated in the second direction.

8. The shift device according to claim 7, further comprising:
a nonvolatile storage section that stores the linearly approximated first estimated value, the linearly approximated second estimated value, the center of the backlash which is a central value between the linearly approximated first estimated value and the linearly approximated second estimated value, and the output value of the output shaft rotational angle sensor and the output value of the rotor rotational angle sensor corresponding to the center of the backlash.

* * * * *